United States Patent [19]

Lorett

[11] Patent Number: 5,072,608
[45] Date of Patent: Dec. 17, 1991

[54] REDUCTION OF TRANSIENT THERMAL STRESSES IN MACHINE COMPONENTS

[75] Inventor: Jerzy A. Lorett, Beaumaris, Australia

[73] Assignee: BW/IP International, Inc., Long Beach, Calif.

[21] Appl. No.: 552,075

[22] Filed: Jul. 13, 1990

Related U.S. Application Data

[62] Division of Ser. No. 394,115, Aug. 15, 1989, Pat. No. 4,997,361.

[51] Int. Cl.$^5$ ............................................. B21D 53/10
[52] U.S. Cl. ...................................... 72/364; 72/341; 384/905

[58] Field of Search ................ 384/278, 905; 248/901; 72/341, 364, 365.2, 366.2

[56] References Cited

U.S. PATENT DOCUMENTS

| | | | |
|---|---|---|---|
| 925,028 | 6/1909 | Richards | 72/372 |
| 2,586,011 | 2/1952 | Doelter | 72/365.2 |
| 4,313,248 | 2/1982 | Fujikake | 29/890.048 |

*Primary Examiner*—Lowell A. Larson
*Attorney, Agent, or Firm*—David A. Hall

[57] ABSTRACT

A method of treating a surface of a machine element to permit the outer layers thereof to freely expand when repeatedly subjected to sudden temperature variations without thermal stressing the inner layers thereof.

2 Claims, 2 Drawing Sheets

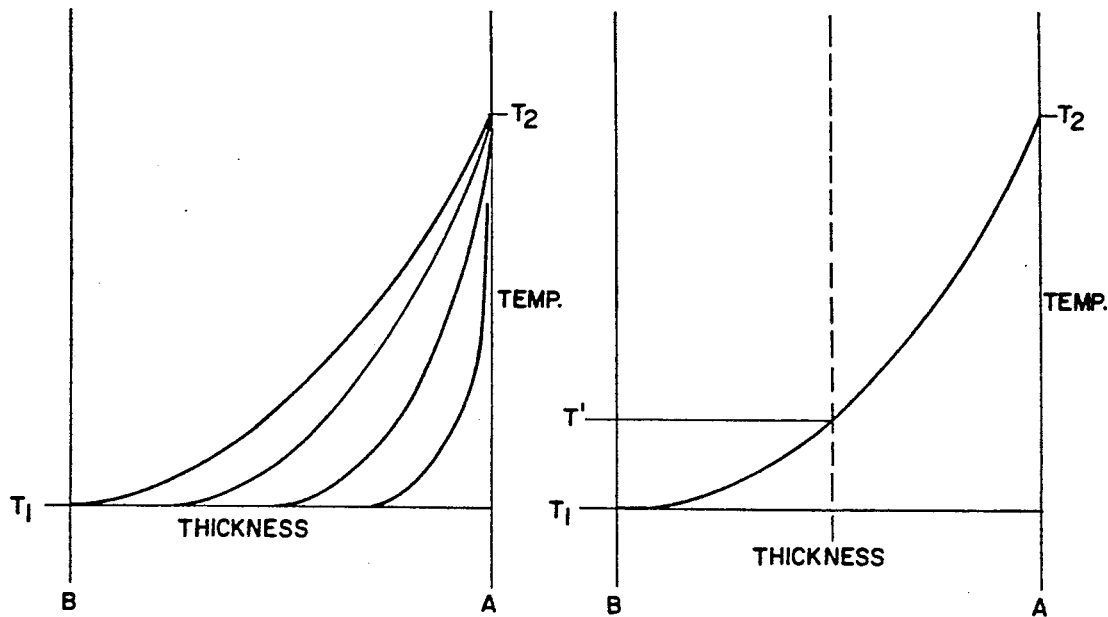
FIG. 1
FIG. 2
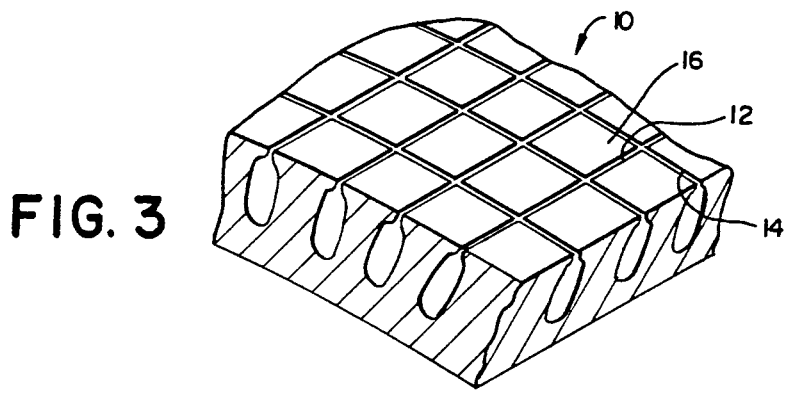
FIG. 3
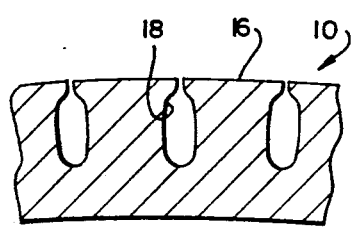
FIG. 4
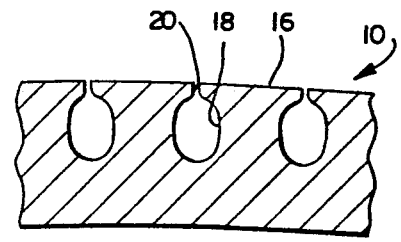
FIG. 5

REDUCTION OF TRANSIENT THERMAL STRESSES IN MACHINE COMPONENTS

This is a division of application Ser. No. 07/394,116, filed Aug. 15, 1989, now U.S. Pat. No. 4,997,361 granted Mar. 5, 1991.

BACKGROUND OF THE INVENTION

This invention relates to the reduction in thermal stresses in machine components which are subjected to sudden temperature variations and which thermal stresses can cause failure of the component. The invention can find particular use in components of pumps for pumping hot fluids and the like.

In the usual centrifugal pump, there is a space or cavity behind the impeller into which product fluid can pass to the system. Common practice is to use one or more mechanical seals encircling the shaft which connects the pump impeller and its driving means, such as an electric motor. On the impeller side of the mechanical seal, cold fluid, such as cold water, is injected into the system to flow through a gap between the pump housing and the drive shaft. This cold fluid flows into the space or cavity behind the impeller and then into the discharge from the impeller. The cold fluid provides a cooling media for the shaft. At times, pressure pulsations in the space or cavity behind the impeller cause periodic flow reversal, i.e., hot product fluid flowing toward the mechanical seal through the gap between the housing and the drive shaft. Because of the sudden temperature variations due to the aforesaid operating conditions, thermal stresses are induced into the drive shaft which could cause failure of the shaft and a shutdown of the equipment. To protect or shield the drive shaft from such thermal stresses, one or more sleeves encircling the shaft are used. However, these sleeves are also subjected to thermal stresses in the same manner as the shaft itself, and are thus subject to failure, requiring a shut down of the equipment for a part replacement.

BRIEF SUMMARY OF THE INVENTION

According to the invention to be described herein, thermal stresses in machine components are reduced by providing the surface of the component which is subjected to the sudden temperature variations with a suitable configuration, to be described.

The suitable configuration of the surface to be exposed to the sudden temperature variations is achieved in stages by:
1. machining narrow open slots, both axially and peripherally on the surface to be exposed to the sudden temperature variations;
2. then locally rolling, hammering or shot peening the machined surface, thus closing the surface ends of the slots while retaining cavities in the body of the part; and
3. rapidly heating the outer surface of the part to a temperature which exceeds the maximum service temperature differential to be encountered in service, and cooling thereafter, so that the closed slots slightly open to the surface, which will subsequently permit the outer layers of the part to expand both axially and peripherally when subjected to the sudden temperature variations encountered in service without causing thermal stresses in the inner layers of the part.

The method just described is applicable for treating the outer surface of sleeves for use in a pump as described and can also be used for treating internal surfaces, such as the internal surface of cylindrical members. A sleeve with a treated surface, can also be produced from a flat sheet of metal. The sheet is machined to provided the open-ended grooves, after which the machined sheet is rolled, hammered or shot peened to close the open ends of the grooves. Heating and cooling the sheet, as described in step 3 above, causes the heads of the grooves or slots to open as extremely narrow slits which are sufficient to avoid thermal stresses on repeated heating and cooling. The so treated sheet is then rolled into cylindrical form, either with the treated surface facing inwardly or outwardly, as desired.

BRIEF DESCRIPTION OF THE DRAWINGS

FIG. 1 illustrates temperature profiles of an untreated sleeve of uniform thickness wherein temperature is plotted against thickness of the sleeve;

FIG. 2 illustrates the temperature profile of a sleeve of uniform thickness treated according to this invention with temperature plotted against thickness of the sleeve;

FIG. 3 is a perspective illustration of a portion of a sleeve after having axial and peripheral slots machined therein;

FIG. 4 is a partial end view of the sleeve of FIG. 3 after it machined surface is rolled, hammered or shot peened to heal over the surface and close the open ends of the slots, leaving communicating cavities therein;

FIG. 5 is a partial end view of the sleeve of FIG. 4 after being rapidly heated to an elevated temperature and subsequently cooled, so as to open up the closed ends of the slots a small amount.

DETAILED DESCRIPTION OF THE INVENTION

Figure 6:
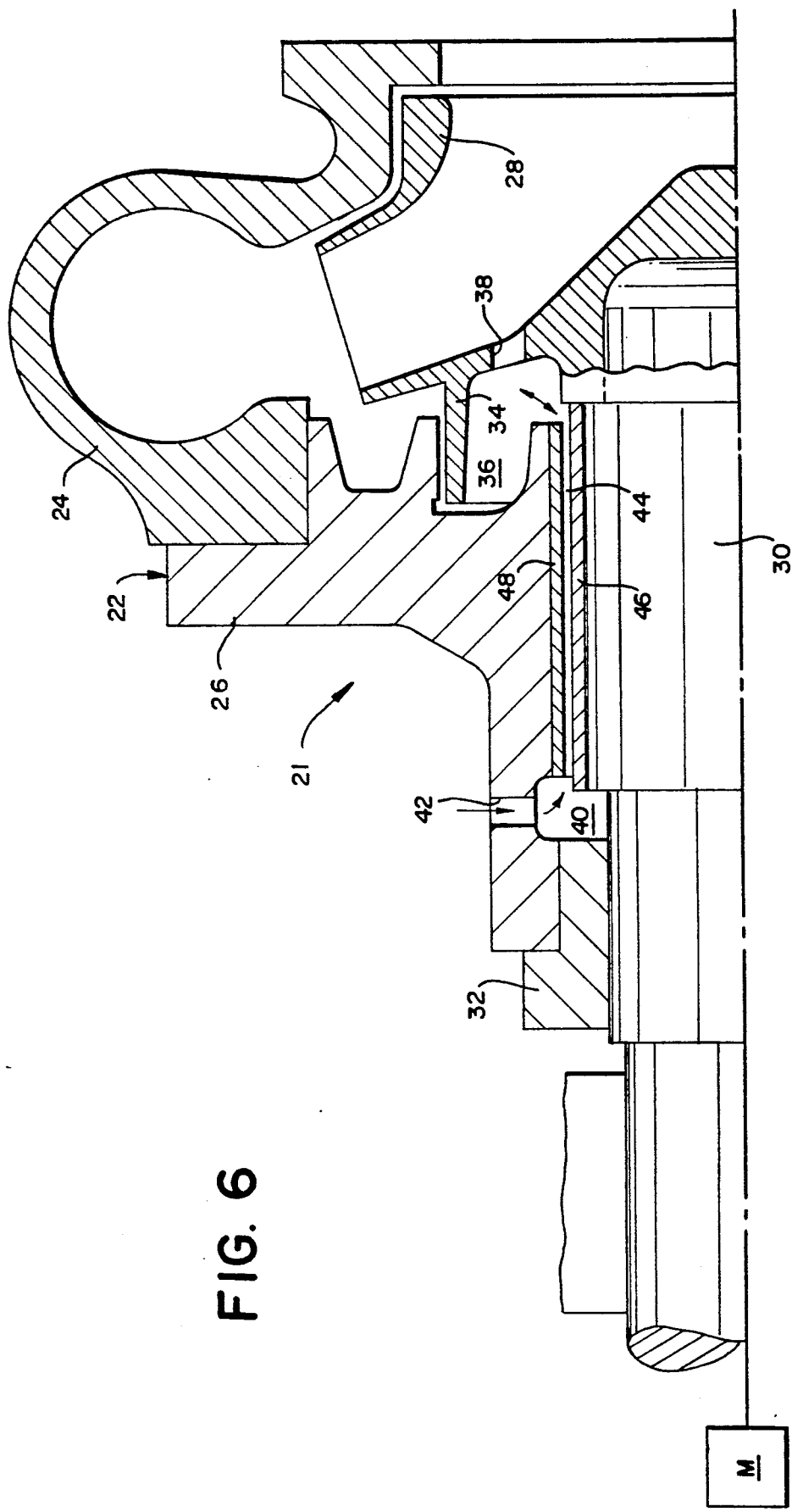
FIG. 6 is a cross-sectional view of a typical centrifugal—mechanical seal assembly in which one or more sleeves as described herein are used to shield the shaft or at least a portion thereof from thermal stresses.

The subject of this invention is to reduce thermal stresses in a machine component by providing the surface of the component to be exposed to the temperature variations with a special configuration. The underlying principle can be explained by using a shaft sleeve as an example, the surface of the sleeve being exposed to fluid flow at sharply varying temperatures which can be on the order of 100 degrees F. to 1000 degrees F. or more.

As illustrated in FIG. 1 of the drawings, when a solid sleeve of uniform thickness S initially at a temperature $T_1$ is suddenly exposed on its outer surface A to high heat transfer fluid flow having a temperature $T_2$, the temperature profile will follow the curves a, b, c, d . . . as time progresses. The highest temperature differential inside the sleeve is reached when the inner surface B just begins to heat, curve D. The resulting thermal stress inside the sleeve is directly proportional to the temperature difference $T_1 - T_2$. The ability of the sleeve to expand axially and peripherally is being restrained by the cold inner layers.

To reduce these thermal stresses, it is proposed herein to make the outer layers of the element free to expand when subsequently exposed to sudden and wide variations in temperature without stressing the inner layers under conditions encountered during use. In FIG. 2 wherein the outer surface is again identified as A and the inner surface as B, it is shown that when the outer portion of the sleeve thickness is free to expand peripherally and axially, a much smaller temperature differential in the inner portion of the element will give rise to greatly reduced thermal stresses, this time being proportional to $T'-T_1$ instead of being proportional to $T_2-T_1$.

As previously explained, the configuration of the surface of the component to be exposed to the sudden temperature variations is achieved in stages, i.e., 1. machining narrow open slots in the surface to be exposed, the slots running both axially and peripherally;
2. rolling, hammering or shot peening the machined surface to close the open ends of the slots, leaving cavities therein which communicate with one another; and
3. rapidly heating the treated surface to a temperature in excess of the maximum service temperature differential so as to leave after cooling clearance between the slot to permit expansion of the component both axially and peripherally without causing thermal stresses therein when subjected to the sudden temperature variations.

Instead of treating a cylindrical member, a flat metal sheet can be treated and the rolled into cylindrical form with the treated surface facing outwardly or inwardly, as desired. Other geometrical forms can also be produced using the method described.

Looking now at FIGS. 3, 4 and 5, there are shown portions of a tubular sleeve 10 in which open-ended slots 12 and 14 have been machined axially and peripherally therein, which slots open to the surface 16 of the sleeve 10. The surface 16 is then subjected to a metal working operation, such as being rolled, hammered or shot peened, all well know processes which require no further description, to heal over the surface 16 leaving communicating cavities 18 therein. The processed sleeve is then heated rapidly to an elevated temperature in excess of the maximum service temperature differential which causes the surface 16 to yield locally as at 20. When cold, the closed slots open sufficiently (as very narrow slits) to allow free expansion in the outer layers on repeated heating without stressing the inner layers thereof.

A sleeve for a pump as illustrated and to be described can be on the order of ¼ to ½ inch thick and on the order of 20 inches in length, with the machined slots being on the order of 1/16 inch in width and ⅛ inch in depth. The finished and treated sleeve has openings or slits on its treated surface on the order of 0.001 inch wide. The temperature to which the sleeve is rapidly heated is on the order of 1000 degrees F. and above. The sleeve is generally constructed of a ductile steel or a bronze, and in use can be subjected to temperatures in excess of 1000 degrees F.

FIG. 6 illustrates a pump in which a sleeve treated as described can be used. The pump is generally identified by the reference number 21 and comprises a pump housing 22 which is of multiple parts, such as 24 and 26, enclosing an impeller 28 connected by a shaft 30 to a driving means (not shown) such as an electric motor. The motor is indicated by the letter M. A mechanical seal, schematically indicated at 32, encircles the shaft 30 and is located to substantially prevent or materially reduce the flow of product fluid along the shaft to the motor M. The mechanical seal 32 can be of usual construction with relatively rotating seal rings, one being connected for rotation with the shaft and the other being connected to the housing. Multiple mechanical seal assemblies can be used if necessary, as taught in the prior art.

As illustrated, a portion 34 of the impeller extends into a cavity 36 of the housing 22 and the impeller has an opening 38 therethrough which communicates with the cavity 36. Another cavity 40 is provided at a location closely adjacent the mechanical seal 32 and on the impeller side thereof. An inlet 42 communicating with the cavity 40 is provided in the housing and is connected to a source of cooling fluid, such as water. A gap 44 exists between the housing 22 and the shaft 30 for the flow of the coolant along the shaft to the impeller where it mixes with any product fluid in the cavity 36 and is discharged by the impeller.

As illustrated, the shaft 22 is encircled by sleeves 46 and 48 constructed according to this invention. The sleeve 46 shields and protects the shaft 22 from thermal stresses while the cover sleeve 48 protects a portion of the housing. The gap 44 referred to previously, in the embodiment being described, is defined by the sleeves 46 and 48. It is to understood that a pump can be constructed without the cover sleeve, if desired.

At times a pulsating pressure exists in the cavity 36 which causes flow reversal, i.e., a flow of product fluid through the gap 44 to the coolant cavity 46, thus exposing the sleeve or sleeves, constructed according to the invention described herein, to sudden temperature variations. Because of their construction, the outer layers of the sleeves which are exposed to the sudden temperature variations can expand without stressing the inner layers and thus shield and protect the shaft (and/or the housing) from thermal stresses caused by the sudden temperature variations.

While the invention has been specifically described with reference to a pump, it is to be understood that the invention has broader uses, especially in devices wherein sudden temperature variations can occur, as for example, diesel engines and the like.

Thus, the appended claims are intended to cover all reasonable equivalents and are to be given the broadest interpretation as limited by the prior art.

I claim:

1. A method for producing a component for use in mechanisms wherein the component is used to protect another component in the mechanism from thermal stresses, comprising:
    providing a component for use in a mechanism;
    machining a plurality of open-ended slots in said component, said slots intersecting a surface of the component;
    closing the open ends of said slots by metal working techniques while retaining cavities beneath the surface;
    rapidly heating the component to a elevated temperature in excess of the temperature differential to which the component surfaces will be exposed during use to thereby cause the slots to slightly open, permitting said component to be subjected to sudden temperature variations during use without thermal stresses therein.
2. A method as recited in claim 1, wherein said slightly open slots allow free expansion of outer layers of said component without stressing inner layers thereof.

* * * * *